United States Patent [19]

Belt

[11] Patent Number: 4,966,758
[45] Date of Patent: Oct. 30, 1990

[54] VACUUM AMPULE FILTRATION DEVICE
[75] Inventor: William E. Belt, Kansas City, Mo.
[73] Assignee: Becton, Dickinson and Company, Franklin Lakes, N.J.
[21] Appl. No.: 181,876
[22] Filed: Apr. 15, 1988
[51] Int. Cl.⁵ .................................. B01D 29/01
[52] U.S. Cl. ............................ 422/101; 210/85; 210/321.6; 210/416.1
[58] Field of Search ............ 422/101; 210/85, 321.6, 210/406, 416.1

[56] References Cited
U.S. PATENT DOCUMENTS 4,272,479 6/1981 Huneke et al. ............... 422/101
4,557,902 12/1985 Mussmann ................... 422/101
4,639,316 1/1987 Eldegheidy .................. 210/416.1

Primary Examiner—Robert J. Warden
Assistant Examiner—Timothy M. McMahon
Attorney, Agent, or Firm—Robert S. Beiser

[57] ABSTRACT

A manual liquid filtration device includes a housing having an open upper end providing access to an internal vacuum chamber, and defining a liquid specimen receiving chamber with a filter element adapted for fluid communication with the vaccum chamber. A sealed frangible ampule is contained within the housing. The ampule is evacuated and when broken will produce a vacuum within the housing. The vacuum draws liquid samples through the filter element.

13 Claims, 1 Drawing Sheet

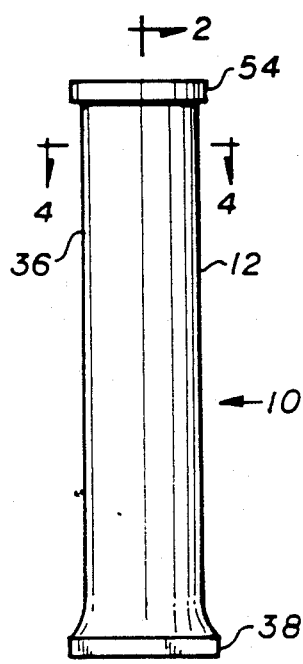
FIG. 1
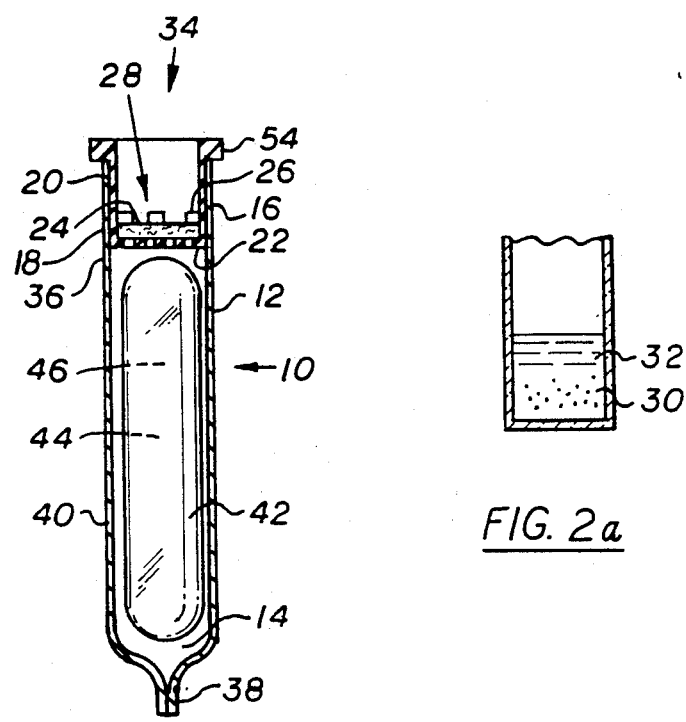
FIG. 2
FIG. 2a
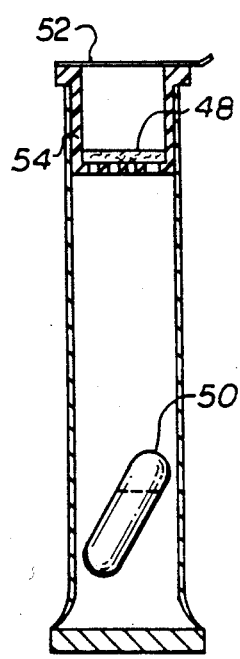
FIG. 3
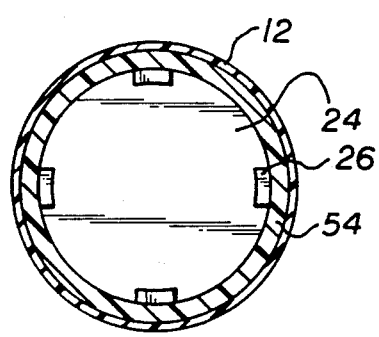
FIG. 4

VACUUM AMPULE FILTRATION DEVICE

BACKGROUND OF THE INVENTION

The present invention relates generally to vacuum filtration devices, and more particularly to a novel disposable vacuum filtration device for separating solid particulate material from a liquid specimen.

In many types of testing and analysis, it is a common practice to require the filtration of a liquid, after which the material retained by the filter element is available for diagnosis or further testing or analysis with other reagents. Similarly, liquids which may have micoorganisms or antibodies present are frequently analyzed by filtering procedures for incubating and analysis. In addition, liquids such as various types of body fluids may have solid test reactants mixed therewith after which the solid reactants are extracted from the liquid by filtering to facilitate analysis of the reactants.

One technique for filtering liquid reagents is to employ a vacuum filtration device having a filter element on which a liquid sample is placed. The liquid is drawn through the filter by vacuum so that the desired contituents are retained on the filter element. See, for example, U.S. Pat. Nos. 2,005,406; 2,896,787, and 3,782,175 each of which employs a vacuum chamber adapted to support a filter element at its upper end and which is operative to filter a liquid sample through the filter element when the vacuum chamber is connected to a source of vacuum. Another device which utilizes suction to draw the liquid portion of a specimen through a filter element and which facilitates both on-site filtering and incubation of micro-organisms in liquid specimens is disclosed in U.S. Pat. No. 2,879,207.

The filtering devices exemplified by the aforementioned U.S. exhibit a number of drawbacks. For example, they require a separate vacuum source such as a vacuum pump to effect vacuum filtering; they are relatively bulky and cumbersome to use; and they require rather complex manipulation to accomplish the desired vacuum filtration.

Marion Laboratories, assignee of the present application, is the owner of U.S. Pat. Nos. 3,891,331; 4,014,748 and 4,311,792 which disclose the use of frangible glass ampules contained within a flexible tube and used for packaging and dispensing reagents. Also known in the prior art is the use of frangible glass ampules having breakable tips to facilitate the passage of a gas to be tested through reagents within the ampule. However, the use of an evacuated ampule or the use of reagents to create a vacuum within an ampule so as to draw liquid through a filter element is not disclosed in the prior art.

SUMMARY OF THE INVENTION

Accordingly, an object of the present invention is to provide a novel manually operable disposable liquid filtration device which is economical to manufacture, simple to use and highly efficient in operation.

A more particular object of the present invention is to provide a novel vacuum filtration device which facilitates manual vacuum filtration of a liquid specimen without need for a separate vacuum pump or laboratory vacuum system.

A further object of the present invention is to provide a novel manually operable vacuum filtration device having a liquid specimen receiving chamber, a porous membrane filter and a vacuum chamber. The vacuum chamber contains a gas and a reagent ampule which, when intermixed and released in the vacuum chamber effect a vacuum sufficient to draw the liquid portion of the specimen through the filter element, with any solid constituent or reactant being retained by the filter element.

A feature of the present vacuum filtration device lies in the utilization of a sealed frangible inner vessel containing a vacuum which, when ruptured, creates a vacuum within the vacuum chamber sufficient to draw liquid from a liquid specimen through the filter element. As a result, any solid constituents of the liquid are retained on the filter element for diagnosis or application of a further liquid reagent.

Another feature of the present invention lies in the provision of a flexible outer vessel which allows the frangible inner vessel to be easily ruptured without danger to the user, while at the same time retaining a vacuum within the outer vessel following such rupture.

Further objects and advantages of the invention, together with the organization and manner of operation thereof, will become apparent from the following detailed description of the invention, when taken in conjunction with the accompanying drawing wherein like reference numerals designate like elements throughout the several views.

BRIEF DESCRIPTION OF THE DRAWINGS

FIG. 1 is a front perspective view of a vacuum filtration device constructed in accordance with the present invention;

FIG. 2 is a vertical sectional view taken substantially along line 2—2 of FIG. 1.

FIG. 2A is a vertical section of a liquid specimen having solid constituents.

FIG. 3 is a vertical sectional view of an alternate embodiment of the filtration device of FIG. 1 with one of the reagents contained within an ampule and a second reagent contained within the outer vessel.

FIG. 4 is a top plan view of the vacuum filtration device of FIG. 1.

DETAILED DESCRIPTION OF THE PREFERRED EMBODIMENT

Referring to the drawings, a vacuum filtration device constructed in accordance with the present invention is indicated generally at 10. The vacuum filtration device 10 is a relatively inexpensive, disposable manually operable filtration device which may be readily hand manipulated to effect vacuum filtration of small quantities of liquids without need for a separate vacuum pump or laboratory vacuum system. The vacuum filtration device finds particular application where a modest degree of vacuum and relatively small evacuated volume are required to carry out the desired filtration procedure.

Turning now to FIG. 2, very generally, the vacuum filtration device 10 includes a housing, indicated generally at 12, which defines an internal generally cylindrical vacuum chamber 14. The housing 12 has an annular neck or wall 16 at its upper end which defines a filter receiving chamber 18. Contained within the filter receiving chamber 18 is a filter assembly 20, the lower end of which has a filter support platform 22 formed as an integral part of the assembly. The filter support platform 22 serves to support a porous membrane filter element 24 which is maintained in fixed relation on the filter support platform by a filter retaining cap 26 mounted on the upper neck 16. The retaining cap 26 defines an internal liquid specimen receiving chamber 28 immediately overlying the filter element.

The vaccum filtration device 10 may also be characterized as a diagnostic test device for separating solid particulate material 30 from a liquid 32 as shown in FIG. 2A. Liquid 32 may comprise various liquids which in their natural state may have mico-organisms such as broth; or various types body fluids such as mucous, saliva or blood.

The housing 12 may also be characterized as a flexible outer vessel having an opening 34 at a first end 36, a sealed second opposite end 38 with closed side walls 40. Flexible outer vessel 12 is constructed of plastic materials such as polyethylene, polypropylene or other polyolefin blends. One example of such material is Clear-Lam Products, Laminate No. CL5040.

Contained within flexible outer vessel 12 is a sealed frangible inner vessel 42 containing first and second reagents 44 and 46 respectively. The preferred embodiment for the first reagent 44 comprises carbon dioxide in gaseous form and second reagent 46 comprises sodium hydroxide solution. These are preferred because of ease of use, safety and compatability with existing equipment in manufacturing. However, alternate reagents such as oxygen and linseed oil, hydrogen chloride and water, or ammonia and water may be used. When the first reagent 44 and the second reagent 46 are intermixed, a vacuum is created within the inner vessel 12. By crushing the innver vessel by manual manipulation through the flexible outer vessel, a relative vacuum is effectuated in the chamber 14. In the embodiment described above, utilizing carbon dioxide and sodium hydroxide as reagents, a vacuum of 28 inches of mercury has been produced. The vacuum within the outer vessel 12 causes the liquid 32, when deposited on filter element 24, to be drawn through filter element 24 leaving all the solid particulate matter 30 on the filter element 24. The particular solid particulate matter 30 being filtered may be controlled by the use of specific pore size filters. Filter elements 24 preferably comprises a micropore filter, such as manufactured by Milipore Corporation, having hydrophilic properties. Generally, the pore size may be selected from a range of from 0.25 to 12 microns depending on the material being filtered.

The porous membrane filter element 24 is generally of circular configuration to enable placement over substantially the full upwardly facing surface of the support grid 22 within the housing neck 16. The filter element 24 is characterized by its ability when dry to allow air or other gas to pass therethrough, but which, when wetted by a drop of water or other liquid, prevents air passing through the filter element. The latter characteristic is due to capillary forces retaining liquid in the pores of the filter membranes so as to effectively seal the micropore openings and prevent air flow therethrough. In this manner, a vacuum condition is created in the chamber 14. The filter element is further characterized as enabling the liquid portion of a liquid specimen placed on the filter element to be pulled through the filter membranes by a relatively small magnitude vacuum created within the vacuum chamber. When the liquid from a liquid specimen has been drawn through the filter element, the filter is again sealed by capillary forces acting between the wetted filter membranes to again maintain a vacuum, although reduced, in the vacuum chamber. The filter element may also comprise a 5 micron glass fiber filter supported on a non-woven fabric, such as available from Micro Filtration Systems, Inc.

In some embodiments of the invention, a third reagent 48 such as an antibody or antigen specific to a diagnostic test procedure is coated onto filter element 24, using conventional coating techniques. Thus when the liquid 32 is drawn through the filter element 24, any antibody or antigen specific for the antibody or antigen coated on the filter element will be retained on said filter element 24. Presence of absence of the unknown antibody or antigen may be determined by known techniques.

In a preferred embodiment the sealed frangible inner vessel 42 comprises a glass ampule. As shown in FIG. 2 of the drawings, ampule 50 contains both the carbon dioxide 44 and the sodium hydroxide 46 within the ampule. The reaction of these two reagents results in a partial vacuum within the ampule. When the ampule is broken a partial vacuum is created in the outer vessel 12. Conversely, as shown in FIG. 3, ampule 50 may contain only the sodium hydroxide. The carbon dioxide may be contained within outer vessel 12. In order to retain the carbon dioxide within the outer vessel 12, in the embodiment shown, a peelable film 52 is sealed across the top 26 of outer vessel 12. Examples of such films include paper/poly/foil laminates secured to the entire periphery of the opening 34 by a heat sealable or pressure sensitive adhesive. As further seen in FIG'S 2 and 3 of the drawings, in a preferred embodiment filter assembly 20 comprises a substantially tubular filter holder 54 telescopically engaged with the upper end 36 of flexible housing 12. Filter holder 54 is preferably constructed of an injection moldable plastic. As indicated above, filter cap 26 may be placed within and heat sealed to filter assembly 20 in order to retain filter element 24 thereon.

In use, liquid 32 containing antibodies, antigens or solid particulate material 30 such as micro-organisms is deposited onto the filter element 24. The housing 12 is then grasped by the user between the thumb and the index finger and the ampule 42 is broken, creating a vacuum within the housing 12. As a result, the liquid 32 is drawn through the filter element 24, thereby depositing the micro-organisms 30 onto the filter element 24. In the case of antibody or antigen in solution the opportunity for the specific attachment to the antibody or antigen coated filter is afforded as the solution is drawn through filter element 24.

The foregoing description merely explains and illustrates the invention and the invention is not limited thereto except insofar as those who have the disclosure before them are able to make modifications and variations therein without departing from the scope of the invention.

What is claimed is:

1. A diagnostic test device for filtering small quantities of a liquid sample comprising;
    a flexible outer vessel having an opening at a first end, a sealed second opposite end and closed sidewalls; and
    a filter diposed proximate said opening and substantially sealing said opening against the passage of air when wet; and
    an evacuated and sealed frangible inner vessel, said evacuated and sealed frangible inner vessel when ruptured being effective to create a vacuum in said outer vessel, thereby drawing said liquid through said filter so as to filter said liquid.

2. The diagnostic test device of claim 1 wherein said filter further comprises a third reagent selected from one or more of the group comprising antibodies and antigens.

3. A liquid filtration device comprising, in combination, a flexible housing having upper and lower ends and defining an internal chamber opening outwardly of said housing, said housing further defining a liquid specimen receiving chamber at its upper end adapted for flow communication with said internal chamber, a filter element interposed between and exposed to said specimen receiving chamber and said internal chamber, said filter element being characterized as substantially impervious to air flow therethrough when wetted by liquid but enabling the flow of specimen liquid therethrough when subjected to vacuum within said internal chamber, and vacuum means mounted within said housing, said vacuum means being effective to create a vacuum therein, said vacuum means comprising an evacuated sealed frangible inner vessel disposed within said flexible housing, a first and second reagent said frangible inner vessel containing at least one of said first and second reagents, said first and second reagents being interactive with each other to produce a vacuum when combined.

4. The liquid filtration device of claim 3 wherein said first reagent is contained within said frangible inner vessel and said second reagent is contained outside of said frangible inner vessel but inside said housing.

5. The liquid filtration device of claim 3 wherein said first reagent comprises a gas.

6. The liquid filtration device of claim 3 wherein said first reagent comprises carbon dioxide and said second reagent comprises carbon sodium hydroxide.

7. The liquid filtration device of claim 3 wherein said first reagent comprises oxygen and said second reagent comprises linseed oil.

8. The liquid filtration device of claim 3 wherein said first reagent comprises hydrogen chloride said second reagent comprises water.

9. The liquid filtration device of claim 3 wherein said sealed frangible inner vessel comprises a glass ampule.

10. The liquid filtration device of claim 3 wherein said housing comprises a tube constructed of flexible thermoplastic material.

11. The liquid filtration device of claim 4 wherein said housing comprises a thermoplastic tube and said housing further comprises sealing means for sealing said upper end of said housing so as to prevent the escape of said second reagent.

12. The liquid filtration device of claim 3 wherein said sealing means comprises a peelable barrier film hermetically sealed across said upper end of housing so as to seal same.

13. The liquid filtration device of claim 3 wherein said liquid specimen receiving chamber comprises a substantially rigid filter holder assembly telescopically engaged with said upper end of said housing.

* * * * *